Sept. 28, 1971  R. L. FENNER  3,608,376
XERITRON
Filed June 17, 1969
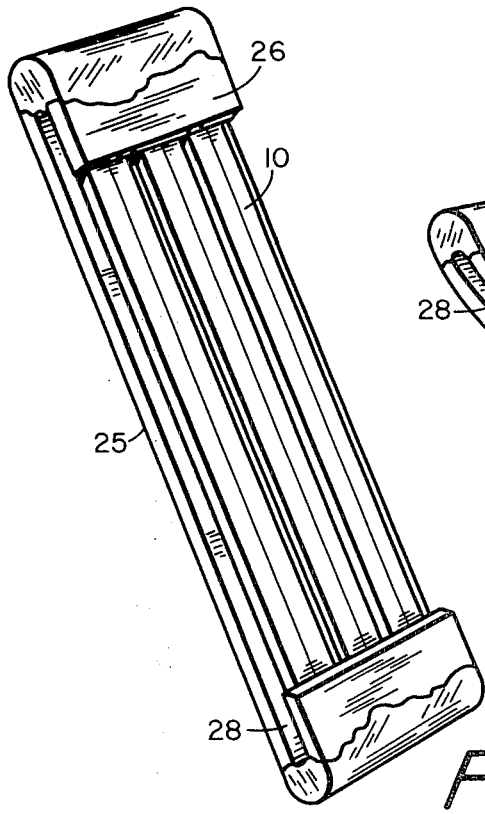
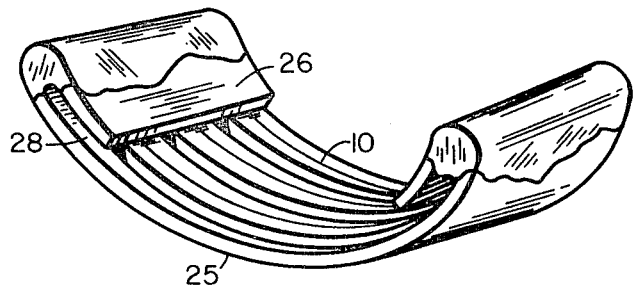
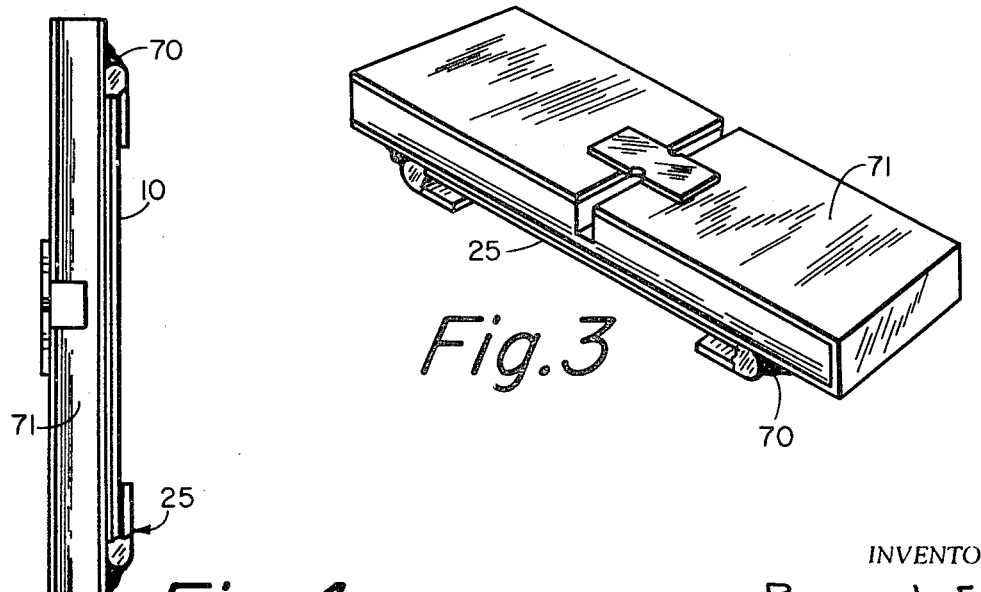
INVENTOR.
RALPH L. FENNER
BY
ATTORNEY

United States Patent Office

3,608,376
Patented Sept. 28, 1971

3,608,376
XERITRON
Ralph L. Fenner, Mill Valley, Calif., assignor to
Hygrometrix, Inc.
Filed June 17, 1969, Ser. No. 834,092
Int. Cl. G01n *19/10, 27/00*
U.S. Cl. 73—336.5                    10 Claims

ABSTRACT OF THE DISCLOSURE

A humidity sensitive element or chip to which an electrical strain gauge, or more specifically, a "pixie" transducer, is attached. While the chip is in the fully saturated state, it is mounted on the back of the pixie strain gauge as by soldering the ends thereto. While the strain gauge will resist bending, the xeric chip exerts a bending force upon it which effects its piezoresistive characteristics directly proportional to the force on the chip which, in turn, is directly proportional to the dryness of the environment in which the device is placed.

OBJECTS

It is a primary object of the present invention to provide a device which is sensitive to relative humidity, or vapor pressure, and which gives an electrical reading directly proportional to the relative humidity of the environment in which the device is placed.

It is another object of the present invention to provide a xerometric device which transmits an electric current directly proportional to the relative humidity of the environment surrounding the device.

It is still another object of the invention to provide the combination of a xerometric device and a piezoresistive device, the combination affording a highly accurate means for electrically transmiting the response of the xerometric device.

It is another object of the present invention to provide a device of the class described which is simple in construction, reliable in its operation, which has a long life, and which transmits a reading directly proportional to the relative humidity of the environment of the device.

It is another object of the present invention to provide a modulating element operable by a xerometric sensor and operable to control the flow of current in a telemetering device whereby the xerometric sensor transmits an accurate reading to a remote position.

These and other objects of the invention will be apparent from the following detailed description of the device taken in conjunction with the accompanying drawings in which:

SPECIFICATION

FIG. 1 is a perspective view of an enlarged scale of the chip, or partially bridled, xeric element of the abovementioned application showing its form when the moisture-sensitive fibers register saturation, or 100% humidity.

FIG. 2 is a perspective view of the element of FIG. 1 shown in the form which it assumes when the fibrous moisture-sensitive elements are completely dry.

FIG. 3 is a perspective view of a piezoresistive device with the xerometric element of FIG. 1 rigidly secured to the back thereof.

FIG. 4 is a side view of the xeritron shown in FIG. 3.

In the preferred form of my invention, I prefer to use a "bridled" element of the type shown in FIGS. 6 to 8, inclusive, of my above-mentioned application. Such an element has the xeric element attached to its supporting plate only at its ends, and hence is really only partially bridled thereto; but such elements in this art are commonly referred to as "bridled" as it is assumed that a fully bridled element (i.e., one in which the xeric element is attached to the plate throughout its entire length) will be so specified. The bridled element preferably comprises a saddle 25 formed of thin resilient material, such as a beryllium copper sheet with a thickness of one-one thousandths of an inch. I have found that a suitable size for practical application of the invention uses a saddle formed of a sheet 25 of such material, having a length of fourteen millimeters and a width of two millimeters. Each end is bent back upon a common face to form a pocket 28 at the respective ends of the chip, each tab 26 having a length of two millimeters. This leaves a chip, or saddle, having a pocket 28 at each end wtih an overall length of ten millimeters and an overall width of two millimeters.

The moisture-senstive element 10 comprises the rib, or spine, of the throwing arm of the seed pod of a seed-throwing plant, such as *Geranium dissectum*, *Geranium Richardsonii*, *Geranium caespitosum*, or *Geranium eriostemon*. The seed pods are harvested after the seeds have been thrown. Preferably, the throwing arms are removed from the remainder of the seed pod and these arms are soaked in warm water, preferably held to the temperature of the range of from about 80° to about 100° F. for a period of about three weeks, or until the fibrous covering of a rib of the arm is readily separated from the rib by pulling the arm through tightly compressed fingers of an operator. A section of nine millimeters in length is taken from these ribs 10 to be used in the bridling element. Since the ribs of the preferred plants are flat on one side and rounded on the other, it is a simple matter to place them flat on the chips 25, and if more than one element is used on a chip, to place all of them flat side against the chip so that the warp force of all of them works in the same direction. Preferably, three or four such elements are used, as I have found that they equalize the small variances that may be found in individual elements, and furthermore, that several are desirable to easily overcome the anti-bending characteristics of the chip, whereby the combined force of the xeric elements can exert a strong bending force at all degrees of relative humidity. The desired number of ribs 10 are placed with their ends in their respective pockets 28 and are immediately dip soldered in melted solder to fill the pockets with solder and thus rigidly attach the ends of the fibers to the respective ends of the saddle 25. While the members 10 are a vegetable composition, and therefore can be burned and do suffer an irreversible loss of effectiveness when heated to a temperature of above 120° C., the momentary dipping of the completely saturated fibers in the liquid solder does not harm them. The resultant chip, or bridled element, at this stage continues to assume the form shown in FIG. 1 in which the saddle 25 is perfectly straight. If permitted to dry, the fibrous elements would have a sufficient warp force to cause the saddle 25 to bend to form the arcuate member shown in FIG. 2. It should be noted that since the xeric elements 10, in their dry and natural state, form a helix lying in a single plane, the saddle 25 is subjected to a simple bending action only and not to a complicated twisting.

While the xeric elements 10 are saturated and the chip 25 assumes the form shown in FIG. 1, the chip is immediately soldered on the back of a "pixie" transducer 71, manufactured by the Endevco Laboratories of Mountain View, Calif. Transducers, or strain gauges, of this type are described in the Patent to L. B. Wilner, No. 3,351,880, issued Nov. 7, 1967, and more fully described in a paper entitled "Piezoresistive Force Changes and Their Uses" by L. B. Wilner, at the Washington, D.C. Transducer Conference, Feb. 10 and 11, 1969. Briefly speaking, these "pixie" transducers are piezoresistive devices of high sensitivity placed on a substrate of P-type silicon with stress current and voltage all in the III crystal direction. It is thus a semiconductor mounted on an electromechanical substrate. Since such transducers are not claimed per se herein and are fully described in the patent and article above-mentioned, it is believed unnecessary to further describe their characteristics. It will be obvious to those skilled in the art that any strain gauge could be used in place of the "pixie" transducer which is preferred.

As mentioned above, the chip 25, in its fully saturated condition shown in FIG. 1, is attached to the backside of the "pixie" transducer 71 as shown in FIGS. 3 and 4. A preferred method of securing the two together is by means of soldering the ends of the chip, as indicated at 70, to the back of a strain gauge 71. In its preferred form, the thermitron, which is a combination of the xerometric device of FIG. 1, with the "pixie" transducer or strain gauge 71, is clamped between the leads (not shown) of a telemetering system, so that the force exerted by the xerometric chip 25 applies a variable force, depending upon the humidity of the environment, upon the strain gauge 71; and that, in turn, varies the resistance of the circuit directly proportional to the force of the xerometric element, or what is saying the same thing, to the relative humidity of the environment.

It will be understood that the drawings and the above disclosure show a preferred embodiment of my invention and that many modifications will occur to those skilled in the art which will not depart from the inventive concepts herein disclosed. For example, it is obvious to those skilled in the art that any number of strain gauges can be used in lieu of the "pixie" transducer shown and described. Also, it is obvious that the xerometric element does not have to be the bridled form shown in the figures, but the vegetable fibers used as the sensor could be applied directly to the back of the strain gauge, as by the use of epoxy cement; the xerometric element could be fully bridled on its chip and the chip could be fully bridled to the strain gauge throughout its length. Accordingly, it is intended that the appended claims cover such modifications as fall within the true spirit and concept of the invention.

I claim:

1. A xeritron comprising the combination of a strain gauge which gives an electrical signal that is proportional to the bending force applied thereto, a xeric element comprising a moisture sensitive fiber taken from the rib of the throwing arm of a seed pod of a seed throwing plant and which changes shape responsive to the moisture sensed, and means to attach said xeric element to said strain gauge in a manner to apply only a bending force to the strain gauge.

2. The xeritron of claim 1 wherein the strain gauge includes a piezoresistive transducer.

3. The xeritron of claim 1 in which the xeric element comprises a saddle formed of a thin resilient metal, a moisture-sensitive fiber taken from the seed-throwing arm of the seed pod of the group of plants consisting of *Geranium dissectum, Geranium Richardsonii, Geranium caespitosum,* and *Geranium eriostomas* rigidly secured to the saddle.

4. The device of claim 3 in which a plurality of the moisture-sensitive fibers are secured to the metal saddle.

5. The xeritron of claim 3 in which the moisture-sensitive fiber is taken from the seed pod of the plant *Geranium dissectum.*

6. The xeritron of claim 3 in which the moisture-sensitive fiber is taken from the seed pod of the plant *Geranium Richardsonii.*

7. The xeritron of claim 3 in which the moisture-sensitive fiber is taken from the seed pod of the plant *Geranium caespitosum.*

8. The xeritron of claim 3 in which the moisture-sensitive fiber is taken from the seed pod of the plant *Geranium eriostemon.*

9. The xeric element of claim 3 in which the resilient metal is a sheet of beryllium copper with a thickness of approximately $\frac{1}{1000}$ of an inch, and the moisture-sensitive fiber is attached thereto only at its ends.

10. A xeritron comprising a saddle formed of a thin resilient metal, a moisture-sensitive fiber taken from the seed-throwing arm of a seed pod of the group of plants consisting of *Geranium dissectum, Geranium Richardsonii, Geranium caespitosum* and *Geranium eriostemon,* means for rigidly securing the moisture-sensitive fiber at its ends to the saddle, a piezoresistive transducer, means for securing said saddle to said transducer, and means for placing said transducer in an electric circuit.

References Cited

UNITED STATES PATENTS

| | | | |
|---|---|---|---|
| 2,157,685 | 5/1939 | Anderson | 73—337 |
| 2,461,310 | 2/1949 | Cilley | 73—336.5 |
| 2,699,062 | 1/1955 | Tomaschek | 73—337.5 |
| 3,135,117 | 6/1964 | Fenner | 73—337 |
| 3,198,011 | 8/1965 | Fenner | 73—337.5 |
| 3,306,108 | 2/1967 | Harrington | 73—337 |
| 3,351,880 | 11/1967 | Wilner | 338—6 |

OTHER REFERENCES

"Gray's Manual of Botany" rewritten by Merrit Lydon Fernald: eighth edition; copyright 1950 pages 946 and 947; copy in possession of Mr. Bagwill, group 330.

copy in possession of Mr. Bagwill, group 330.

"Just Weeds" by Edwin Rollin Spencer, page 141, copyright 1940 and 1957; copy in possession of Mr. Bagwill, group 330.

LOUIS R. PRINCE, Primary Examiner

D. E. CORR, Assistant Examiner